(12) United States Patent
Lann

(10) Patent No.: US 7,086,117 B2
(45) Date of Patent: Aug. 8, 2006

(54) GRILL RACK CLEANING DEVICE AND METHOD

(76) Inventor: Daniel Howard Lann, 319 Sims Rd., Blacksburg, SC (US) 29702

( * ) Notice: Subject to any disclaimer, the term of this patent is extended or adjusted under 35 U.S.C. 154(b) by 224 days.

(21) Appl. No.: 10/694,515

(22) Filed: Oct. 27, 2003

(65) Prior Publication Data

US 2005/0086757 A1   Apr. 28, 2005

(51) Int. Cl.
*A47L 13/02* (2006.01)
(52) U.S. Cl. .............. 15/236.07; 15/236.09; 15/236.06
(58) Field of Classification Search ............ 15/236.06, 15/236.07, 236.09
See application file for complete search history.

(56) References Cited

U.S. PATENT DOCUMENTS

| | | | | |
|---|---|---|---|---|
| 2,615,577 A | * | 10/1952 | Bartleman | 211/70.6 |
| 4,119,285 A | * | 10/1978 | Bisping et al. | 248/72 |
| 4,159,773 A | * | 7/1979 | Losenno | 211/70.6 |
| 4,209,098 A | * | 6/1980 | Adams | 211/70.8 |
| 4,214,342 A | * | 7/1980 | Amundsen | 15/236.07 |
| 4,668,302 A | | 5/1987 | Kolodziej | |
| 4,910,827 A | | 3/1990 | Tandberg | |
| 4,958,403 A | | 9/1990 | Martin | |
| 5,255,406 A | | 10/1993 | Rood | |
| 5,373,600 A | | 12/1994 | Stojanovski | |
| 5,687,856 A | * | 11/1997 | Kendrena | 211/70.6 |
| 5,720,071 A | | 2/1998 | Hall | |
| 5,987,693 A | | 11/1999 | Noga | |
| 6,023,810 A | * | 2/2000 | Gessert | 15/229.13 |
| 6,594,852 B1 | | 7/2003 | Schedlinski | |
| 6,676,181 B1 | * | 1/2004 | Greiner | 294/7 |

* cited by examiner

*Primary Examiner*—Gladys J P Corcoran
*Assistant Examiner*—Shay L. Balsis
(74) *Attorney, Agent, or Firm*—Shulong Li

(57) ABSTRACT

A grill rack cleaning device is disclosed for efficiently cleaning grill racks having parallel metal rods. The cleaning device comprises a rigid main body and plurality of substantially cylindrical clip members. The clip members are spaced apart from each other in transverse direction; and are secured to said main body in a parallel manner with respect to the longitudinal direction. The clip member comprises a thin, elastically deflectable and substantially cylindrical wall member which surrounds a substantially cylindrical hollow interior, and has an opening along the longitudinal direction. The clip members are sized such that the circular cross section of the hollow interior is approximately the same as the circular cross section of the metal rods in a grill rack to be cleaned.

8 Claims, 7 Drawing Sheets

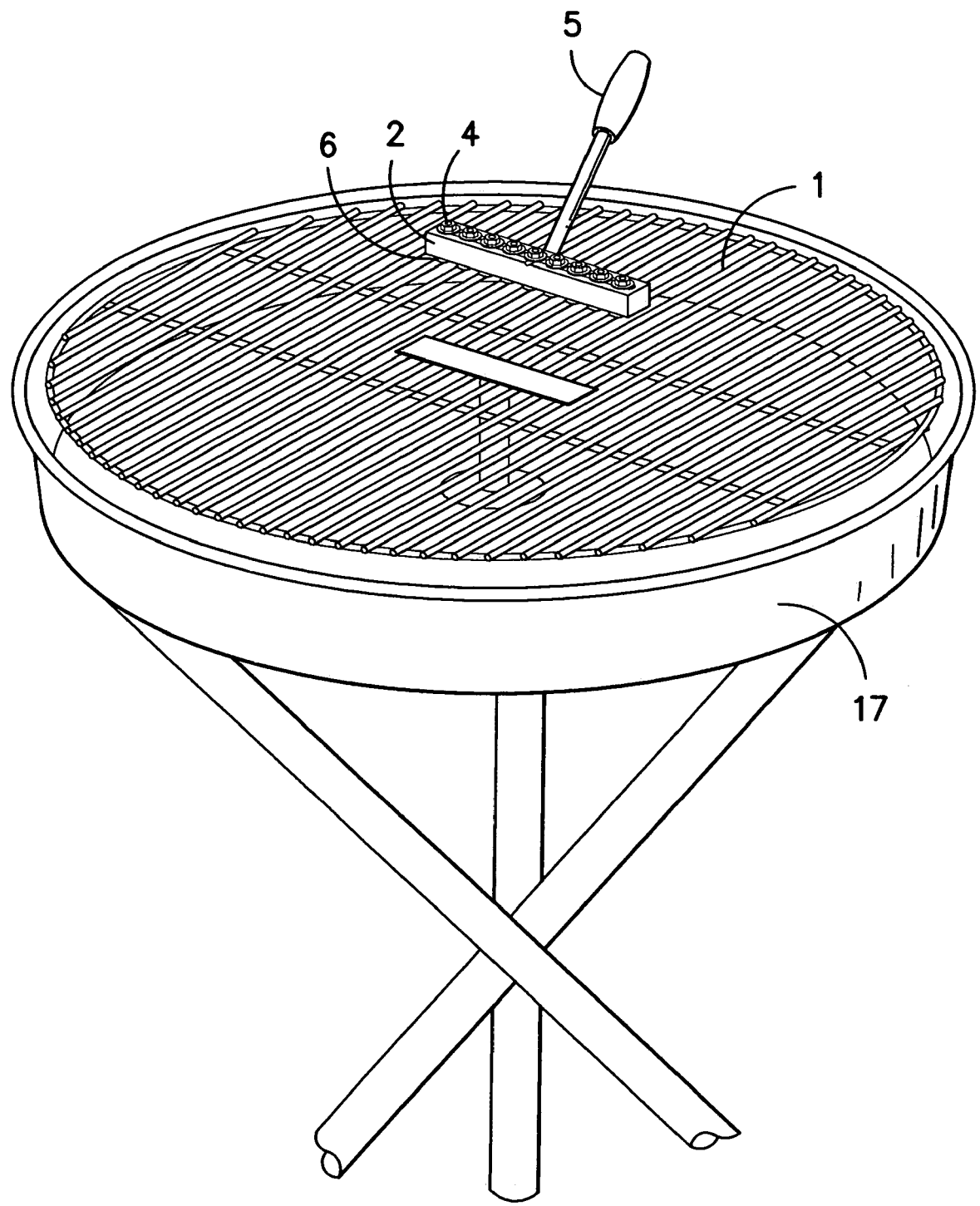
FIG. —1—

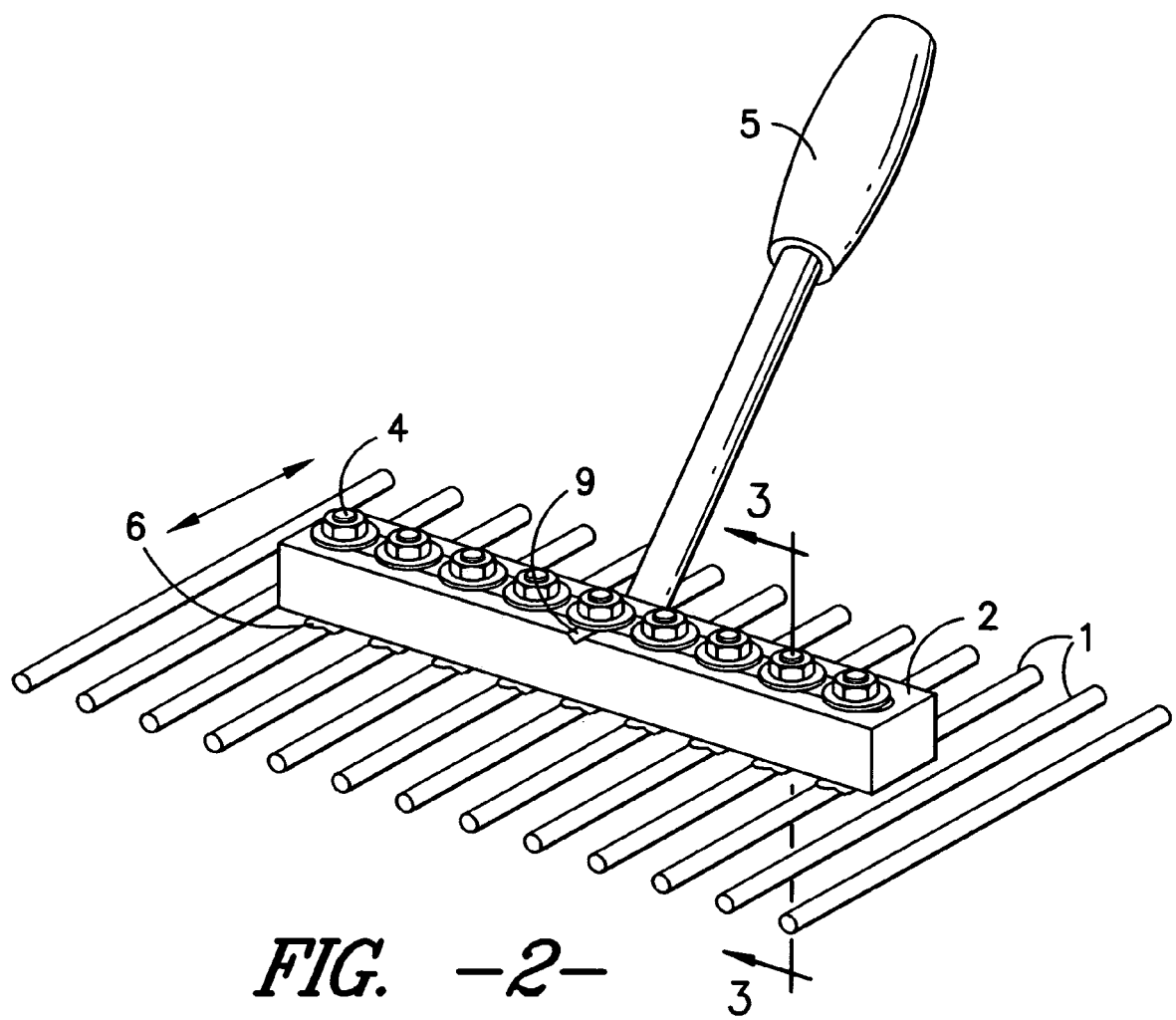
FIG. -2-
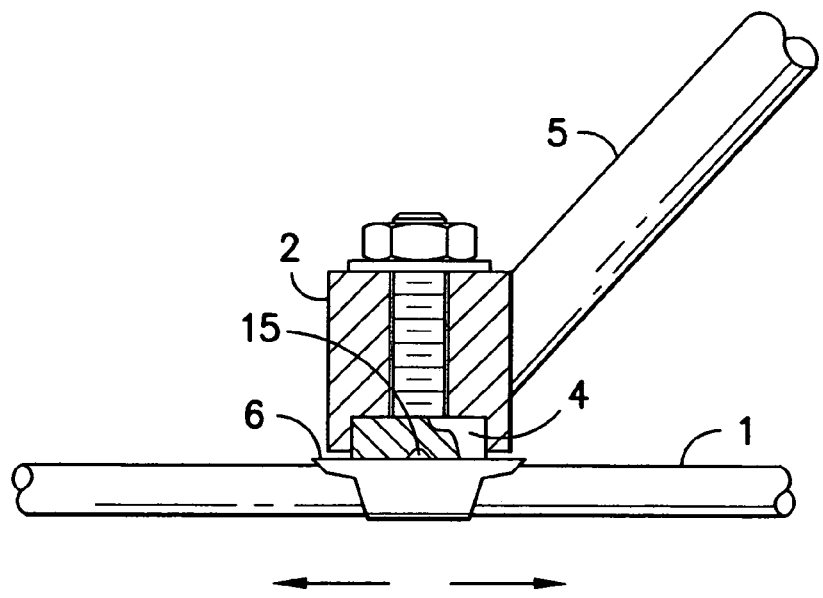
FIG. -3-

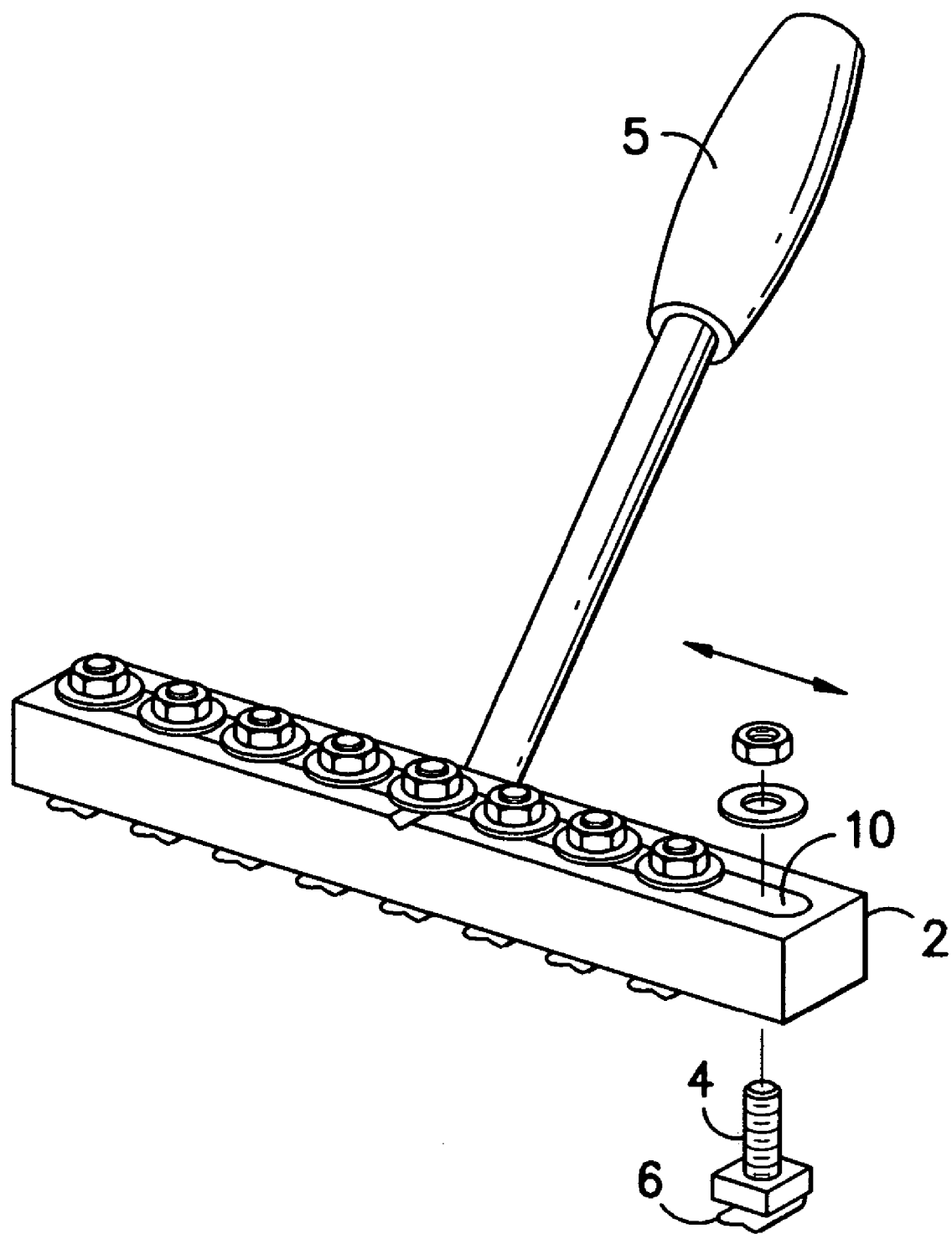
FIG. -4-

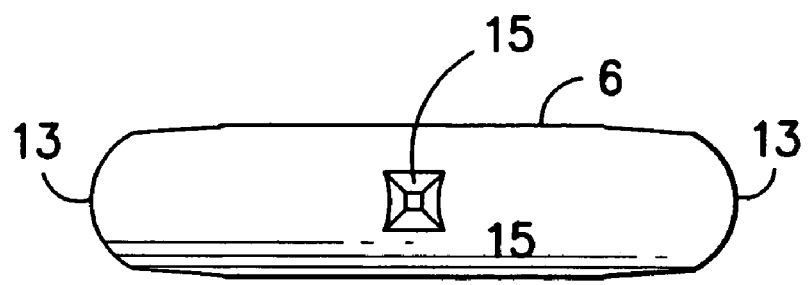
*FIG. -5-*
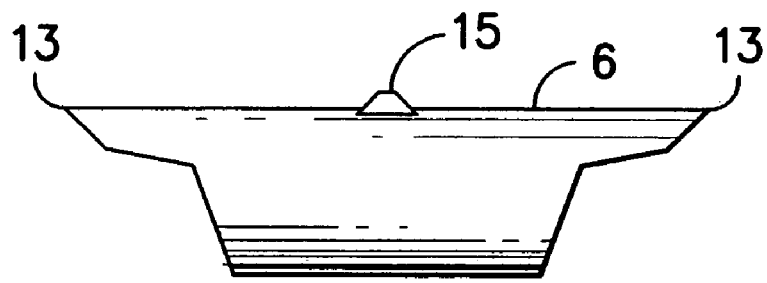
*FIG. -6-*
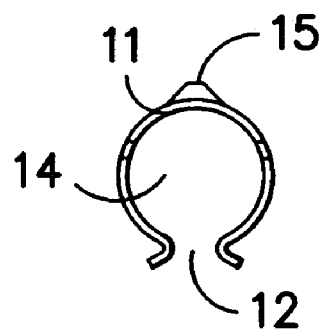
*FIG. -7-*

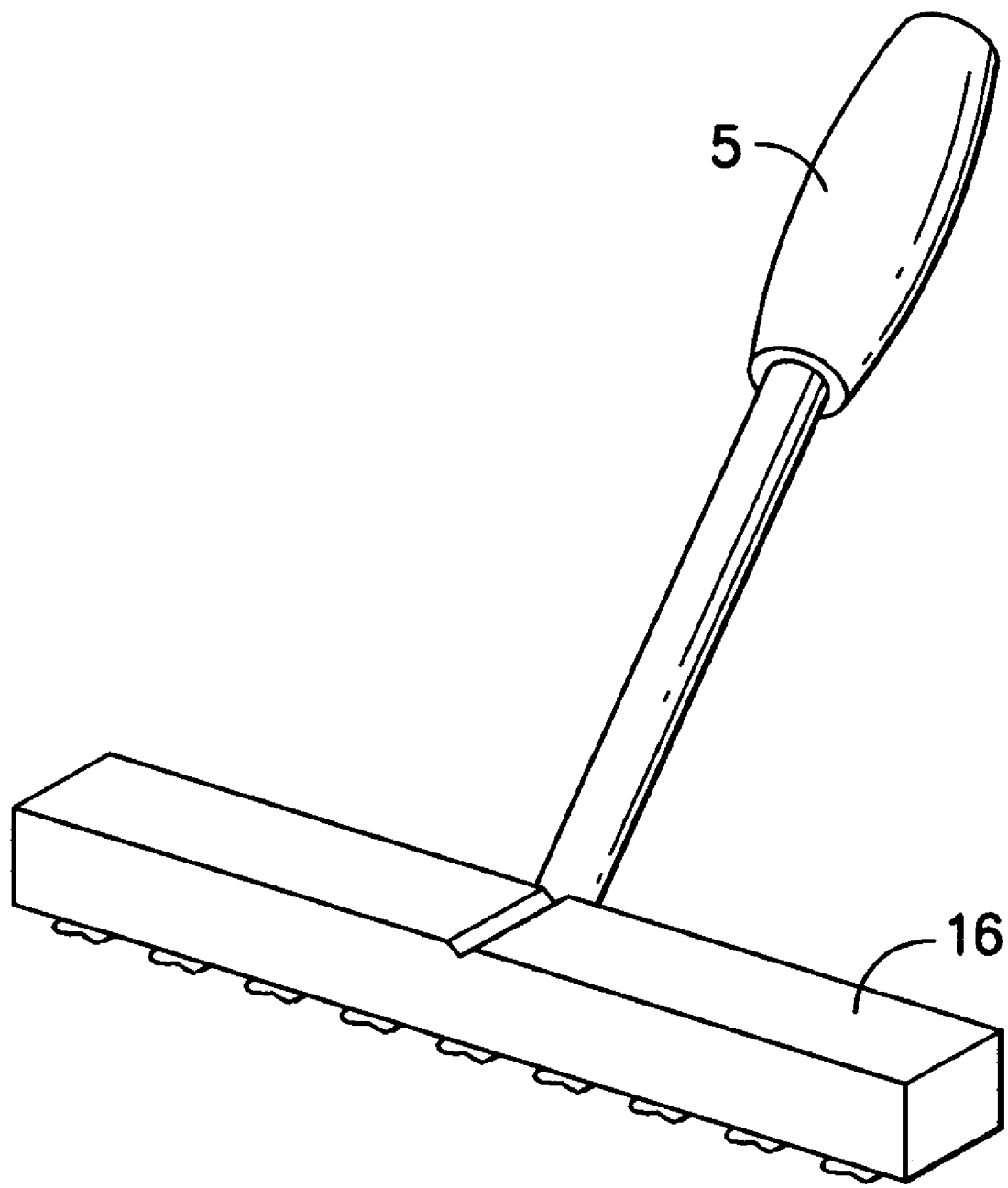
FIG. -8-

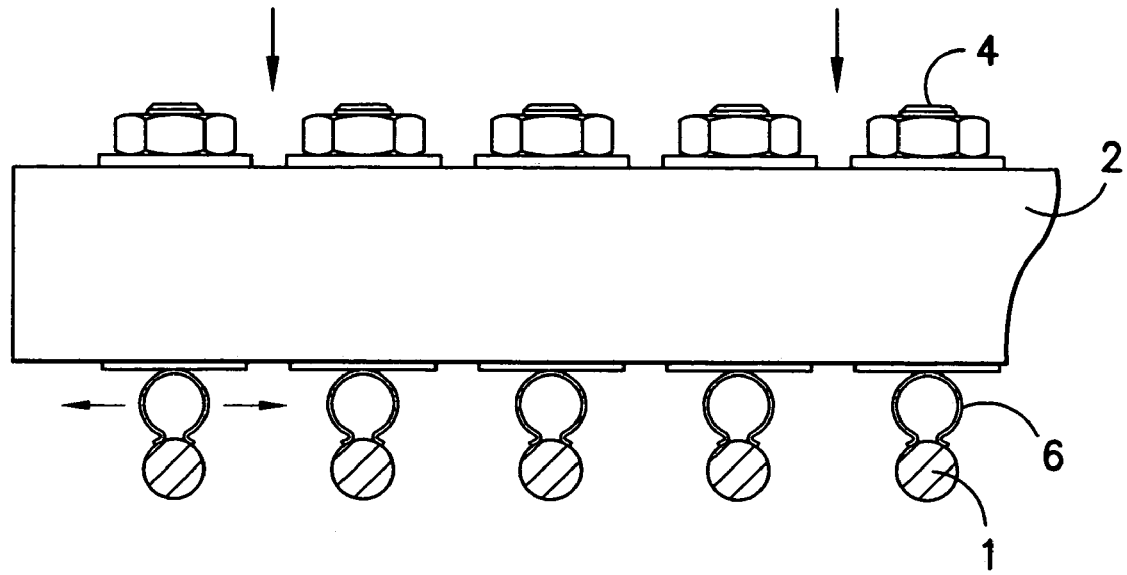
FIG. -9-
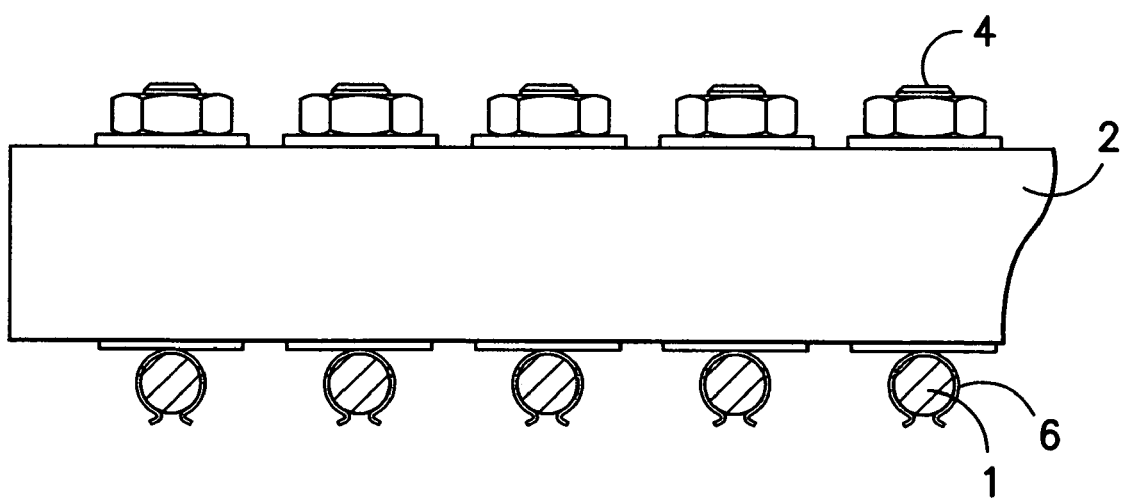
FIG. -10-

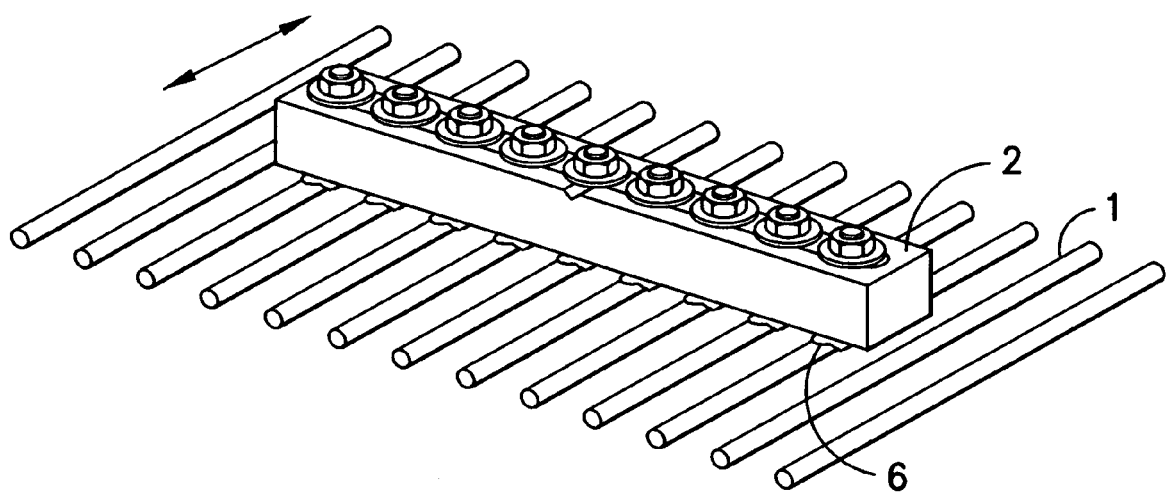
FIG. —11—

GRILL RACK CLEANING DEVICE AND METHOD

BACKGROUND OF THE INVENTION

Grill racks serve as cooking surface in cooking devices used at homes, restaurants, hotels, hospital and other institutions. A grill rack is commonly made of an assembly of parallel metal rods welded to one or more common metal bars perpendicular to those parallel rods. Various deposits and burned food residues on the metal rods of a grill rack are common problems and frequent cleaning to remove such deposits and residues is necessary to maintain a clean cooking surface.

Cleaning devices such as those based on metal brushes and metal scraping blades were disclosed and commercially available. Metal brushes suffer from problems of bending of bristle tips, food residues trapped inside the brush and limited useful life. The scraping blade suffers from the problem of not being able to reach the side and underside of the grill rack. Other cleaning devices do not provide a sharp cutting tip to cut through stubborn food deposits on a grill rack, and are therefore not quite effective.

BRIEF DESCRIPTION OF THE DRAWINGS

FIG. 1 is a perspective view showing the grill rack cleaning device on a grill rack of a cooking device 17.

FIG. 2 is an enlarged perspective view showing the grill rack cleaning device engaged on parallel metal rods of a grill rack.

FIG. 3 is a side view of the grill rack cleaning device engaged on a metal rod of a grill rack.

FIG. 4 is a perspective view of the grill rack cleaning device, showing adjustable screw attachment of clip member 6 to the slot 10 of the main body 2.

FIG. 5 is a top view of a clip member of the grill rack cleaning device.

FIG. 6 is a side view of a clip member of the grill rack cleaning device.

FIG. 7 is a front view of a clip member of the grill rack cleaning device.

FIG. 8 is a perspective view of the grill rack cleaning device with non-adjustable clip members attached to the main body.

FIG. 9 is a cross-sectional view of the grill rack cleaning device pressed against parallel metal rods of a grill rack before the metal rods get inserted into the clip members.

FIG. 10 is cross-sectional view of the grill rack cleaning device with parallel metal rods inserted in the corresponding clip members.

FIG. 11 is a perspective view of a functioning grill rack cleaning device without a handle.

DETAILED DESCRIPTION OF THE INVENTION

It is an object of the present invention to provide a grill rack cleaning device that effectively cuts through stubborn food deposits on a grill rack and simultaneously cleans top, both sides, even bottom side of metal rods in a grill rack. It is also an object of the present invention to provide a grill rack cleaning device having plurality of clip members which can be adjustably positioned to match the metal rod spacing in a grill rack to be cleaned. It is yet another object of the present invention to provide a grill rack cleaning device having an optional detachable handle, and the cleaning device can remain engaged on a grill rack and be functional with or without a handle.

A grill rack cleaning device of the present invention, shown in FIG. 1 and FIG. 2 comprises a rigid main body 2, plurality of substantially cylindrical clip members 6, and optionally an elongated handle 5. The clip members are secured to the main body such that they are parallel to each other in the longitudinal direction of the cylindrical clip members and that they are spaced apart along transverse direction. An optional elongated handle can also be securely attached to the rigid main body 2.

The clip member 6 includes a thin and elastically deflectable wall member 11 as illustrated in FIG. 7, in substantially cylindrical shape, with an opening 12 along the longitudinal side of the cylindrical shape. There is a substantially cylindrical hollow interior 14 surrounded by the wall member. The clip member 6 is sized such that the cross section of the clip member is about the same as, or slightly larger than the cross section of the parallel metal rods 1 in a grill rack to be cleaned. The width of opening 12, shown in FIG. 7, in the clip member is sized to allow the parallel metal rods in a grill rack to slide through the opening and enter the hollow interior 14 of the clip member. The longitudinal edges of the wall member at the opening are preferably bent to form somewhat round edges as illustrated in FIG. 7. Those round edges can facilitate the insertion of metal rods into the interior of the clip member. By "substantially cylindrical", I mean a cylindrical shape with a cross section greater than a half circle, but less than a full circle. The cross section can be perfectly circular or slight distorted circular.

The wall member 11 of the clip member is made of an elastically deflectable sheet metal material. When a small force is applied to the metal sheet, the sheet can deflect easily. When the small force is removed, the sheet will instantly recover and resume the original shape. On the other hand, when large force is applied to cause substantial deformation, the sheet metal material can be permanently bent. Alternatively, the sheet material can be permanently deformed at high temperatures for machining and forming. The metal sheet material can be selected from stainless steel, carbon steel, aluminum alloy, nickel, and other metal alloys. The thickness of the sheet metal is less than one eighth of an inch, and preferably less than one sixteenth of an inch. The longitudinal length of the clip should be long enough to provide mechanical stability for the clip to stand rough handling and cleaning actions. Yet, the length should be short enough to allow easy insertion of metal rods into the clip members, and to allow easy sliding along metal rods for performing cleaning on a grill rack. The length of the clip member is from about 0.1 inch to about 2 inches, preferably from about 0.25 inch to about 0.5 inch. In one embodiment, there is at least one spear 13 at the end of the cylindrical wall member, as shown in FIG. 5 and FIG. 6. The spear 13 provides a protruded point to help cut through potentially tough food deposits on a metal rod. The spear also provide accessible area for spot-welding to secure the clip member to the main body. Spear here is defined as a small extension from the end of the cylindrical wall, having a tapered tip, or a tip with small radius of curvature. The length of a spear is preferably one fourth of the total length of a clip member. In another embodiment, the clip member is made to have a protruded male portion 15 shown in FIGS. 5, 6, and 7, on the wall member to match and fit into a recessed female portion on the main body as illustrated in FIG. 3. The protruded male portion 15 in one embodiment is shaped as a truncated pyramid. Such male and female fitting provides accurate alignment and robust attachment of clip members to the main body. The clip member can be made by cutting a sheet metal into a rectangular or square shape, then bend the rectangular sheet into a substantially cylindrical shape manually or by using a machine tool known to a person of ordinary skill in the art. To have a spear on one end of the clip wall member, one simply cut the sheet metal to leave a spear section extending from one edge of the rectangular or square metal sheet, then bend the metal sheet into a substantially cylindrical shape with the spear 13 on one of the ends. A protruded portion on the clip member can be easily made by stamping or embossing on the wall member at the position where the clip member is to attach to the main body. In one preferred embodiment, the cylindrical clip member is illustrated in FIG. 5, FIG. 6 and FIG. 7.

The main body 2 of the present invention is made of a rigid material which can stand a large force without significant deformation. It also allows clip members and optionally an elongated handle to easily attach to such rigid main body, as shown in FIG. 2, FIG. 3 and FIG. 4. Materials suitable for constructing the rigid main body include stainless steel, aluminum, other metal alloys and rigid composites. In one embodiment, the main body is an elongated metal rod or plate with relative narrow width. In another embodiment, the main body is an metal assembly made of metal strips, wires, screws, bolts, rods, plates or any combinations thereof. In yet another embodiment, the main body has at least one slot 10 to allow multiple clip members to be adjustably attached to the main body as illustrated in FIG. 2, FIG. 3 and FIG. 4. In illustrative FIG. 2, FIG. 3 and FIG. 4, each clip member in the cleaning device is attached to the cap of a square screw bolt which fits snugly inside the slot 10 of the rigid main body. The spacing between clip members can be easily adjusted by sliding the screw 4 along the slot 10 in the transverse direction before the screw 4 is tighten to fix the position of a clip member. In this manner, clip members can be spaced apart to match the spacing between metal rods in a grill rack to be cleaned. To help aim and position clip members to the corresponding positions of parallel metal rods in a grill rack, an index notch 9 as shown in FIG. 2, or other similar markings can be included in the main body. Clip members can be securely attached to the main body by means of welding, screw attachment, adhesive bonding, and other common attachment methods known to a person of ordinary skill in the art. In the case where there is a protruded male portion 15 on each clip member, a corresponding female portion is made by drilling, stamping or other methods on every position of the main body where a clip member is attached. In one preferred embodiment, the clip members are spot welded to the main body.

An optional elongated handle can also be secured to the main body by means of welding, screw attachment, adhesive bonding or other common attachment methods know to a person of ordinary skill in the art. For example, the tip portion of the handle can be made having a male part of a screw, and a corresponding female part of a screw is machined into the main body. The handle can then be screwed onto the main body to facilitate cleaning and unscrewed after cleaning. With such an optional detachable handle, one can remove only the handle after cleaning and leave the grill rack cleaning device on a grill rack without interfering the function of the grill rack. Such arrangement provides convenience for performing cleaning.

In yet another embodiment, the clip members are attached to the main body in a non-adjustable manner as a low cost construction for certain types of grill racks where clip member spacing in the cleaning device is manufactured to match the known metal rods spacing. FIG. 8 illustrates such a device, where clip members are welded to the bottom side of the rigid main body, a solid metal bar 16. An optional elongated handle 5 can also be attached to the metal bar on the side at a slant angle.

To use the cleaning device, one person simply aligns the cleaning device on a grill rack such that each clip member 6 is rested on a metal rod 1 of a grill rack along the clip opening 12, as illustrated in FIG. 9. One person then applies a pressure by hand to force the clip member 6 against the metal rod 1 in vertical direction, causing the clip wall member 11 to deflect outward elastically, which results in expansion of the clip opening 12 and allows the metal rods to insert into the interior of the clip members as illustrated in FIG. 10. Snug contact between the wall member of the clip member with the metal rod surface is achieved in this manner. A sliding force is then applied to the cleaning device in the longitudinal direction of the cylindrical clip, as shown in FIG. 2 and FIG. 3, forcing the clip members to slide along the parallel metal rods of the grill rack. The thin and sharp edge of the wall member of the clip, having snug contact with most of the metal rod surface, can therefore cut through any food deposits on the rods and effectively remove the deposit from the metal rods on virtually all sides. Plurality of clip members are secured on a main body and are spaced apart in parallel manner to match the spacing of metal rods in a grill rack to be cleaned so that multiple metal rods can be cleaned simultaneously. To remove the cleaning device from a grill rack, one person only needs to pull the cleaning device away from the grill rack through the clip opening in vertical direction, causing the wall member of the clip member to deflect outward, which results in expansion of the clip opening to allow the metal rod of a grill rack to slide out from the opening. In one embodiment, one can install the cleaning device on a grill rack by simply inserting the metal rods of the grill rack into the clip members of the cleaning device using the method described above. To clean the grill rack, one can grab the main body by hand, and slide along the longitudinal direction of the metal rods as illustrated in FIG. 11. Optionally, a detachable handle can be used to assist sliding the device along the metal rods of a grill rack. The handle can be easily installed by using a screw attachment, for example, to the main body before performing cleaning. The handle can be remove by unscrewing it from the main body after cleaning. It is not necessary to remove the cleaning device from the grill rack after cleaning. Therefore, the cleaning device can be conveniently located and engaged on a grill rack, and cleaning can be easily and conveniently performed whenever it is needed.

Numerous characteristics and advantages of the invention covered by this document have been set forth in the foregoing description. It will be understood, however, that this disclosure, in many respects, is only illustrative. Changes may be made in details, particularly in matters of shape, size and arrangement of parts without exceeding the scope of the invention. The invention's scope is, of course, defined in the language in which the appended claims are expressed.

I claim:

1. A grill rack cleaning device comprising:
   plurality of substantially cylindrical clip members having a longitudinal opening, said clip member comprising a thin and elastically deflectable wall member which surrounds a substantially cylindrical hollow interior, and said clip members being sized such that the circular cross section of said hollow interior is approximately the same as the circular cross section of the parallel metal rods in a grill rack to be cleaned; and a rigid main body;

wherein said clip members are securely attached to said main body in a parallel manner with respect to the longitudinal direction, and are also spaced apart from each other in transverse direction;

said clip member further comprises a spear at one end and a protruded truncated pyramid portion on said wall member at the position where said clip member is attached to said main body.

2. A grill rack cleaning device comprising:

a rigid main body comprising a metal plate having at least one slot;

a set of screws adjustably secured in said slot of said main body;

and plurality of substantially cylindrical clip members having a continuous arcuate shape with an opening on one end for receiving a grill rod and having a longitudinal opening, each of said clip members being securely attached to one of said screws, said clip members comprising a thin and elastically deflectable metal wall member;

and once engaged on a grill rod to perform cleaning, said clip member being in contact with at least the top portion and both sides of a grill rod.

3. A grill rack cleaning device of claim 2, wherein an elongated handle is further secured to said main body.

4. A grill rack cleaning device of claim 2, wherein said clip member is made of a thin sheet metal material having a thickness of less than about one eighth of an inch.

5. A grill rack cleaning device of claim 4, wherein said clip members are spot-welded to the screws.

6. A grill rack cleaning device of claim 4, wherein said handle is detachable.

7. A method of cleaning a grill rack comprising providing a cleaning device comprising a rigid main body and plurality of substantially cylindrical clip members securely attached to said main body, said clip member having a longitudinal opening and an thin wall member that surrounds an cylindrical interior, said clip members also being spaced apart in a parallel manner to match the metal rods spacing in a grill rack to be cleaned;

placing said cleaning device against a grill rack to be cleaned such that said opening of each clip member rests along the individual parallel metal rod on a grill rack;

applying a pressure to said cleaning device to force said clip members to push against said parallel metal rods of said grill rack, causing said metal rods on said grill rack to insert into said cylindrical interior of said clip members; and Sliding said cleaning device along the longitudinal direction of said metal rods to perform cleaning.

8. A method of cleaning a grill rack of claim 7, wherein said cleaning device further comprises an elongated handle securely attached to said rigid main body.

* * * * *